(12) United States Patent
Darr et al.

(10) Patent No.: US 8,516,150 B2
(45) Date of Patent: Aug. 20, 2013

(54) SYSTEMS AND METHODS FOR MULTIPLE COMPUTER DATALOADING USING A STANDARD DATALOADER

(75) Inventors: Steven James Darr, Phoenix, AZ (US); Nathan John Simcoe, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 192 days.

(21) Appl. No.: 13/084,175

(22) Filed: Apr. 11, 2011

(65) Prior Publication Data

US 2012/0259955 A1    Oct. 11, 2012

(51) Int. Cl.
*G06F 15/173* (2006.01)

(52) U.S. Cl.
USPC .......................................... 709/238

(58) Field of Classification Search
USPC .......................................... 709/238
See application file for complete search history.

(56) References Cited

U.S. PATENT DOCUMENTS

| | | | |
|---|---|---|---|
| 6,738,821 B1 * | 5/2004 | Wilson et al. | 709/230 |
| 6,822,941 B1 * | 11/2004 | Frank | 370/241 |
| 7,443,824 B1 * | 10/2008 | Lipford et al. | 370/338 |
| 7,489,932 B2 * | 2/2009 | Chari et al. | 455/447 |
| 7,808,891 B2 | 10/2010 | Law | |
| 7,840,655 B2 | 11/2010 | Murray et al. | |
| 2003/0204617 A1 | 10/2003 | Buchsbaum et al. | |
| 2006/0031748 A1 | 2/2006 | Brady, Jr. et al. | |
| 2007/0027589 A1 | 2/2007 | Brinkley et al. | |
| 2009/0077265 A1 | 3/2009 | Brinkley et al. | |
| 2009/0138610 A1 | 5/2009 | Gobara et al. | |
| 2009/0304010 A1 | 12/2009 | Kurebayashi et al. | |
| 2010/0023602 A1 * | 1/2010 | Martone | 709/220 |

FOREIGN PATENT DOCUMENTS

JP          5197645           8/1993

OTHER PUBLICATIONS

"ARINC 429 MIL-STD-1553", "www.condoreng.com", Sep. 19, 2003, Publisher: Condor Engineering.
"ARINC 615 Data Loader", "Available at http://defense.ge-ip.com/products/family/arinc-615-data-loader accessed Apr. 8, 2011", 2011, Publisher: GE.
"LOAD615Awin: ARINC 615a Dataloader Software", "Available at http://www.avionica.com/index.php?          option=com_content &view=article&id=17&Itemid=40, Accessed Apr. 8, 2011", , Publisher: Avionica.
"CEI-DL", "Available at http://defense.ge-ip.com/products/1003 accessed Apr. 8, 2011", 2011, Publisher: General Electric Company.

(Continued)

*Primary Examiner* — Alicia Baturay
(74) *Attorney, Agent, or Firm* — Fogg & Powers LLC

(57) ABSTRACT

Systems and methods for multiple computer dataloading using a standard dataloader are provided. In one embodiment, a method for simultaneously uploading duplicate data to a plurality of computers comprises: performing a handshake message exchange with a dataloader to determine a MAC address for a target node; conducting a data transfer between the dataloader and the target node by forwarding a file transfer protocol message having the MAC address for the target node from the dataloader to the target node; forwarding the file transfer protocol message to at least one node other than the target node, wherein the at least one node and the target node both consume the file transfer protocol message; and selectively suppressing one or more response messages generated by the at least one node from reaching the dataloader.

17 Claims, 17 Drawing Sheets

(56) References Cited

OTHER PUBLICATIONS

Ecklund, Rick and Andrew C. Liosis, "Lifecycle Operational Flight Program (OFP) Loading Support for the C-17 Globemaster III Weapon System", "AUTOTESTCON Proceedings, 2001. IEEE Systems Readiness Technology Conference Aug. 20-23, 2001", 2001, pp. 962-976, Publisher: Boeing Co., Published in: Valley Forge, PA.

Peterson et al., "A Blueprint for Introducing Disruptive Technology into the Internet", "Proceedings of the First ACM Workshop on Hot Topics in Networks (HotNets-I)", Jul. 2002, pp. 16, vol. 33, No. 1, Publisher: Intel Corporation, Published in: Princeton, NJ.

"SpeedLoader ARINC 615-3/603 High Speed Data Loader", "Data Sheet Available at http://www.techsat.com/fileadmin/media/pdf/DataSheets.engl/TechSAT-DS-SpeedLoader-EN.pdf", 2008, Publisher: TechSAT GmbH Rev-1004.

\* cited by examiner

SYSTEMS AND METHODS FOR MULTIPLE COMPUTER DATALOADING USING A STANDARD DATALOADER

BACKGROUND

In current avionic computer architectures, loading of data onto multiple computers using a standard ARINC 615A dataloader must be performed one computer at a time. For example, in one proposed 777 LFD architecture, there are five display computers that all require loading of the exact same load image and the same series of databases. Given that the software and databases to be loaded are very large it will take a relatively long amount of time to perform the loading (on the order of 1 to 2 hours, for example) onto a single computer. Since there are five display computers the total amount of time to perform the dataload onto all file display computers will be five times as long.

For the reasons stated above and for other reasons stated below which will become apparent to those skilled in the art upon reading and understanding the specification, there is a need in the art for improved systems and methods for multiple computer dataloading using a standard dataloader.

SUMMARY

The embodiments of the present invention provide methods and systems for multiple computer dataloading and will be understood by reading and studying the following specification.

In one embodiment, a method for simultaneously uploading duplicate data to a plurality of computers comprises: performing a handshake message exchange with a dataloader to determine a MAC address for a target node; conducting a data transfer between the dataloader and the target node by forwarding a file transfer protocol message having the MAC address for the target node from the dataloader to the target node; forwarding the file transfer protocol message to at least one node other than the target node, wherein the at least one node and the target node both consume the file transfer protocol message; and selectively suppressing one or more response messages generated by the at least one node from reaching the dataloader.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
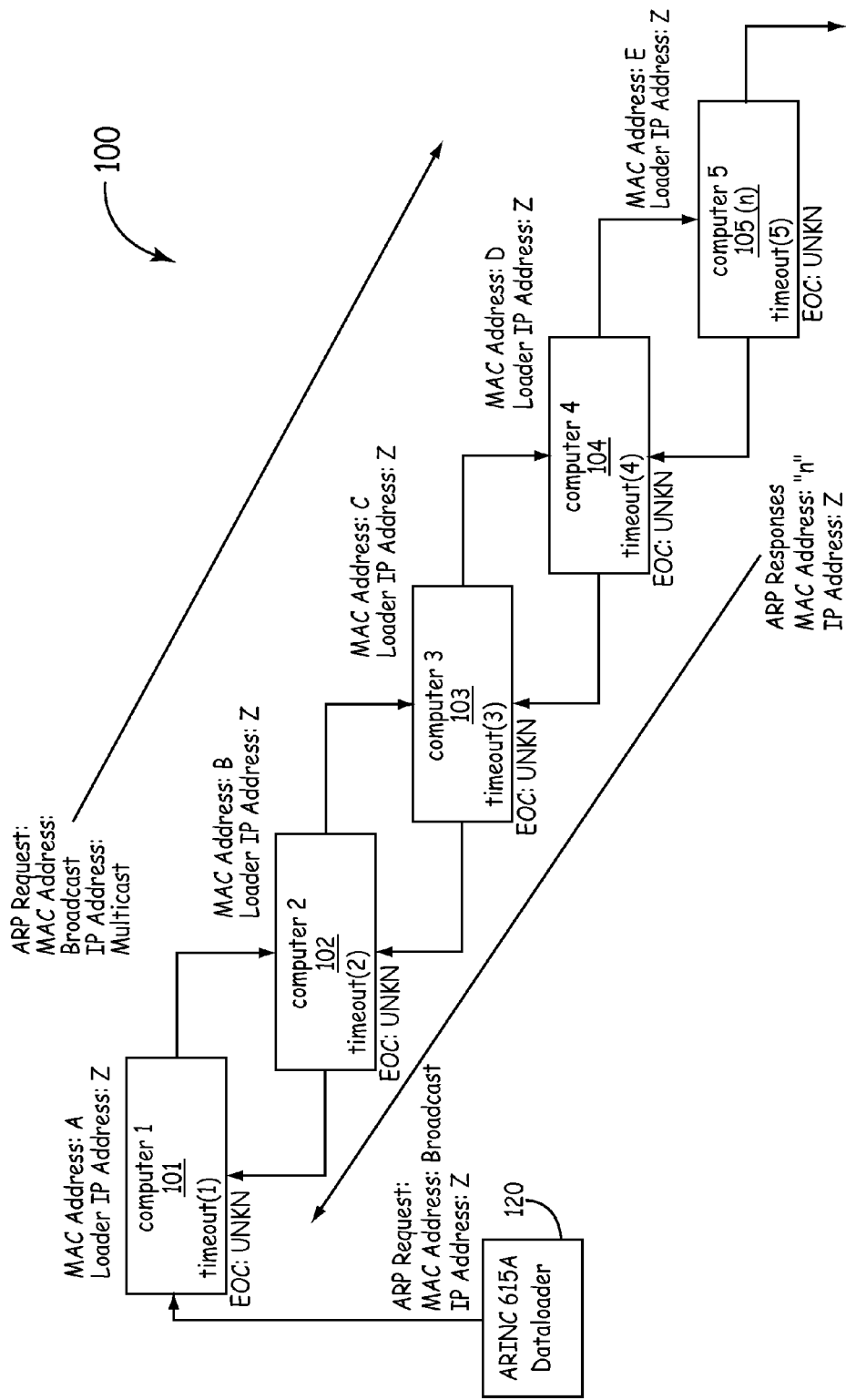
FIG. 1 is a block diagram illustrating a system structure of one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present invention provide systems and methods for using a single standard ARINC 615A dataloader to load identical data onto a plurality of computer systems in a single session through use of a network forwarding function resident on at least one computer connected to the dataloader. That is, the embodiments described herein allow for a user to concurrently load multiple computers using a standard ARNIC 615A dataloader without any special modification to the dataloader.

For some embodiments, by serially linking two or more computers into a chain, the last computer in the chain will effectively communicate with the dataloader on behalf of all of the intervening computers in the chain. The network forwarding function resident on each of the intervening computers would provide for local consumption of data messages and then forward the relevant message packets down the chain of computers. Once the packet has been forwarded to and consumed on the last computer, the last computer would be the one to respond to the dataloader in order to satisfy the file transfer protocol. The last computer may optionally itself have the network forwarding function installed so that it can self identify whether it is the last computer in the chain. Alternately, the last computer may simply be configured to provide standard responses to the protocol without special handling provided by the network forwarding function.

For the intervening computers (i.e., those computers between the data loader and the last computer) their network forwarding function will forward responses from the last computer up the chain to the dataloader, as explained below. During normal operation, each computer will have its own unique internet protocol (IP) address for normal operation traffic. When placed in loader mode however, each of the computers on the network will share the same loader IP address, but have a unique Media Access Control (MAC) layer addresses. The computers would incorporate a dynamic MAC Acceptance Table that would allow the computers to accept packets destined to another computer in the chain, since another computer could be the one directly communicating with the dataloader. As used herein, the terms "computers", "nodes" and "modules" are used interchangeably.

Further, in some implementations the computers discussed herein are aircraft display computers used to display information to a flight crew.

For other embodiments, the dataloader is physically coupled to a single distribution node that executes a network forwarding function, wherein that distribution node is directly coupled to a plurality of computers. In that case, the network forwarding function resident on the distribution node will facilitate a dialog between the dataloader and a first computer of the plurality of computers. As it observes the dialog, the network forwarding function in this configuration would pick-off messages sent from the dataloader to the first computer and broadcast those messages to the other computers.

For example purposes, the descriptions below discuss ARINC 615A implemented Trivial File Transfer Protocol (TFTP) based data transfers. In alternate embodiments, variants of TFTP or other file transfer protocols may be utilized.

FIGS. 1-8 provide block diagrams illustrating a proposed architecture 100 of one embodiment of the present invention for linking a plurality of computers serially. In these figures, an architecture having five computers is illustrated for example purposes only. One of ordinary skill in the art upon reading this disclosure would appreciate that the description provided herein applies to any arbitrary number "N" of computers linked serially. Thus, the actions explained herein with respect to computer 5, being the last computer in the chain, would apply to whatever computer "N" comprises the last computer in the serial chain. Thus, neither the figures nor the description provided herein should be interpreted to limit embodiments of the present invention to chains of five computers.

Referring to FIG. 1, network 100 comprises a plurality of serial linked computers which in FIG. 1 respectively shown at 101 to 105. Each of the computers comprises transmit and receive lines for communicating upstream to any previous computer, and downstream to any and next computer in network 100. Each of the plurality of computers 101-105 is assigned its own MAC address (shown in FIG. 1 as MAC addresses A-E) which is unique on network 100, but each is assigned to share the same loader IP address. By configuring the network 100 this way, up to all the computers on network 101-105 are enabled to talk to the ARINC 615A dataloader 120, but appear to ARINC 615A dataloader 120 as a single computer based on the operation of a network forward function described herein. With embodiments of the present invention, each of the computers in network 100 comprise a network forward function as described in more detail below.

Figure 2:
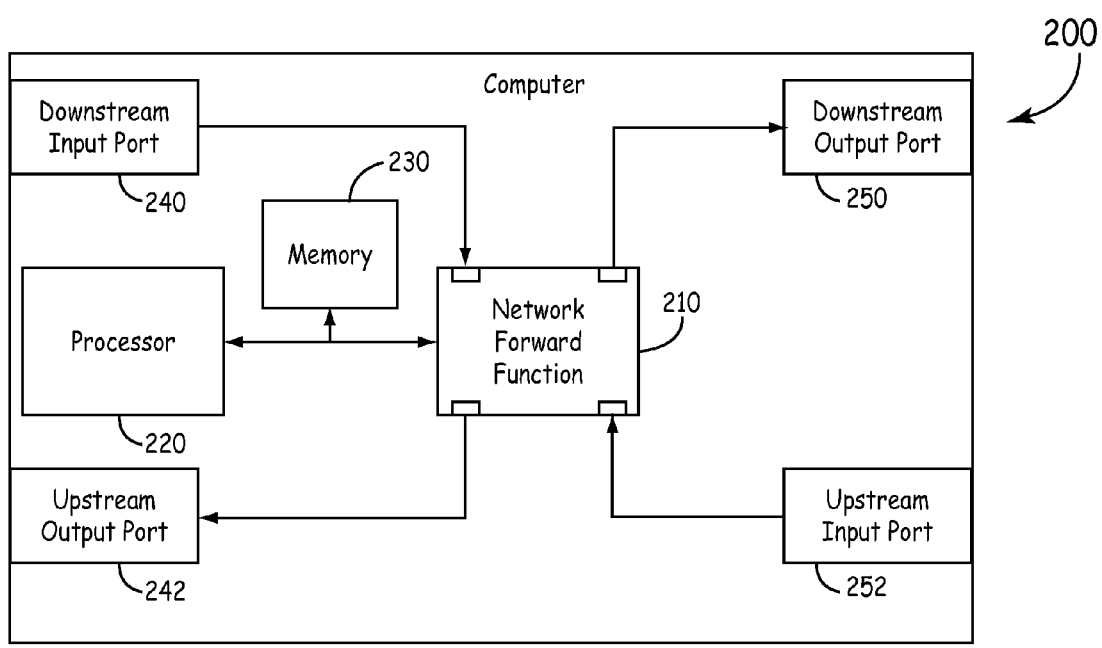
FIG. 2 is a block diagram illustrating a device having a network forwarding function of an embodiment of the present invention.

FIG. 2 is a block diagram illustrating a computer 200 having a network forward function 210, a processor 220, and a memory 230, of one embodiment of the present invention. In one embodiment, each of the computers 101-105 include the structures and functions described herein with respect to computer 200. Computer 200 comprises a downstream input port 240 for receiving messages traveling in the downstream direction, a downstream output port 250 for forwarding (or transmitting) messages in the downstream direction, an upstream input port 252 for receiving messaged traveling in the upstream direction, and an upstream output port 242 for forwarding (or transmitting) messages in the upstream direction. Network forward function 210 monitors message traffic received on downstream input port 240 and upstream input port 252 and manages how computer 200 responds to those messages as described in this specification. For example, when computer 200 is placed in loader mode, network forward function 210 manages the cascading of messages through the serially connected chain of computers. Messages identified by network forward function 210 as consumable for computer 200 are forwarded to memory 230 and processor 220 for further processing. In one embodiment, the network forward function 210 is implemented as a software algorithm that is stored in memory 230 and executed by processor 220.

As the term "consumed" is used in this specification, when a received message is said to be "consumed" by a computer node that means that the received message is processed by the computer's processor in the same manner as if the message were addressed to that computer. Having a received message that is "consumed" by a computer node does not imply that the computer node cannot also forward a copy of the received message along the network chain. That is, consumption of a received message does not in itself result in destruction of the message. Typically, a received message that is not locally consumed would be simply forwarded along the network chain.

FIGS. 3 through 10 are provided to illustrate operation of network 100 in the process of loading software from dataloader 120 onto computers 101-105. This description will presume that each of the computers 101-105 will be loaded with new data and will receive the exact same software update. In operation, each of the computers 101-105 will first be placed into "loader mode", which would be recognized by one of ordinary skill in the art of avionics computer systems as being a mode that permits a computer to load new software. When entering loader mode, computers 101-105 will each set their individual END_OF_CHAIN (EOC) flag to UNKN (unknown). This EOC flag will be used by the network forward function 210 to determine whether the computer it is being executed on is at the end of the chain. As mentioned above, only the computer at the end of the chain in network 100 will communicate directly to the ARINC 615A dataloader 120.

In order for the ARINC 615A dataloader 120 to determine the appropriate MAC address for the last computer on network 100 (which in FIG. 1 is computer 105), it must first send an Address Resolution Protocol (ARP) request to the network 100 with the loader IP Address corresponding to network 100. For this example, the IP address will simply be referred to as "Z". Because the dataloader 120 does not a priori know the MAC addresses for computers on network 100, the ARP requests will use a broadcast MAC Address (such as FF:FF:FF:FF:FF:FF, for example).

Computer 101 will be the first computer in network 100 to receive the ARP Request from dataloader 120. Computer 101 will become aware that it is the first computer in the chain, because the ARP Request it receives contains a specific loader IP Address (Z) rather than a multicast address. Computer 101 will build an appropriate ARP Response containing its MAC Address "A" and IP Address "Z" but it will not immediately transmit that ARP Response back to the dataloader 120 because it has not yet established whether it is the last computer on the chain. Instead computer 101 will hold the ARP Response in its memory 230 and set its counter (shown as timeout(1)) to an initial timeout value (100 ms in this example). In addition, it will change the IP Address contained in the ARP Request from "Z" to a Loader Multicast IP Address and forward the altered ARP Request to its downstream output port 250 to computer 102. In one embodiment, a Loader Multicast IP Address would consists of an address such as XXX.XXX.255.255 where the XXX are the common IP Address values assigned to all the computers when they are placed in loader mode. One of ordinary skill in the art would appreciate that the IP addresses discussed throughout this specification are not necessarily limited to IP4 addresses. For example, alternate embodiments may utilize IP6 addresses instead of, or in addition to IP4 addresses.

Computer 102 will receive the ARP Request on its Downstream Input Port 240. Computer 102 will know that it is not the first computer in the chain because the ARP Request it received contains an Loader Multicast IP Address. Computer 102 will build an appropriate ARP Response that includes it's MAC Address B and the IP Address Z, and it will immediately forward that ARP Response to its Upstream Output Port 242 and on the network back to the computer 101. In addition, computer 102 will set its timeout counter (timeout(2)) to an initial timeout value (100 ms in this example) and forward the ARP Request down the chain to computer 103.

Computer 101 will receive the ARP Response from computer 102. When it does, it will set its EOC Flag to NO, because it has now been made aware that it is not the last computer in the chain. In addition, it will replace the ARP Response it is currently holding in memory 230 with the ARP Response that it has received from down the chain. Lastly, it will increase its counter timeout(1) value by an increment value, which in one embodiment is equal to the initial value. That is, if its initial timeout value timeout(1) was 100 ms, it will add another 100 ms to timeout (1)

Computer 103 will receive the ARP Request from computer 102. Computer 103 will know that it is not the first computer in the chain, since the ARP Request received contains the Loader Multicast IP Address. Since its EOC flag is set to UNKN, computer 103 will build an appropriate ARP Response with MAC Address C/IP Address Z, and it will immediately send in on the network back to the computer 102. In addition, computer 103 will set its counter (timeout (3)) to an initial timeout value (100 ms in this example) and it forward the ARP Request down the chain to computer 104.

Figure 3:
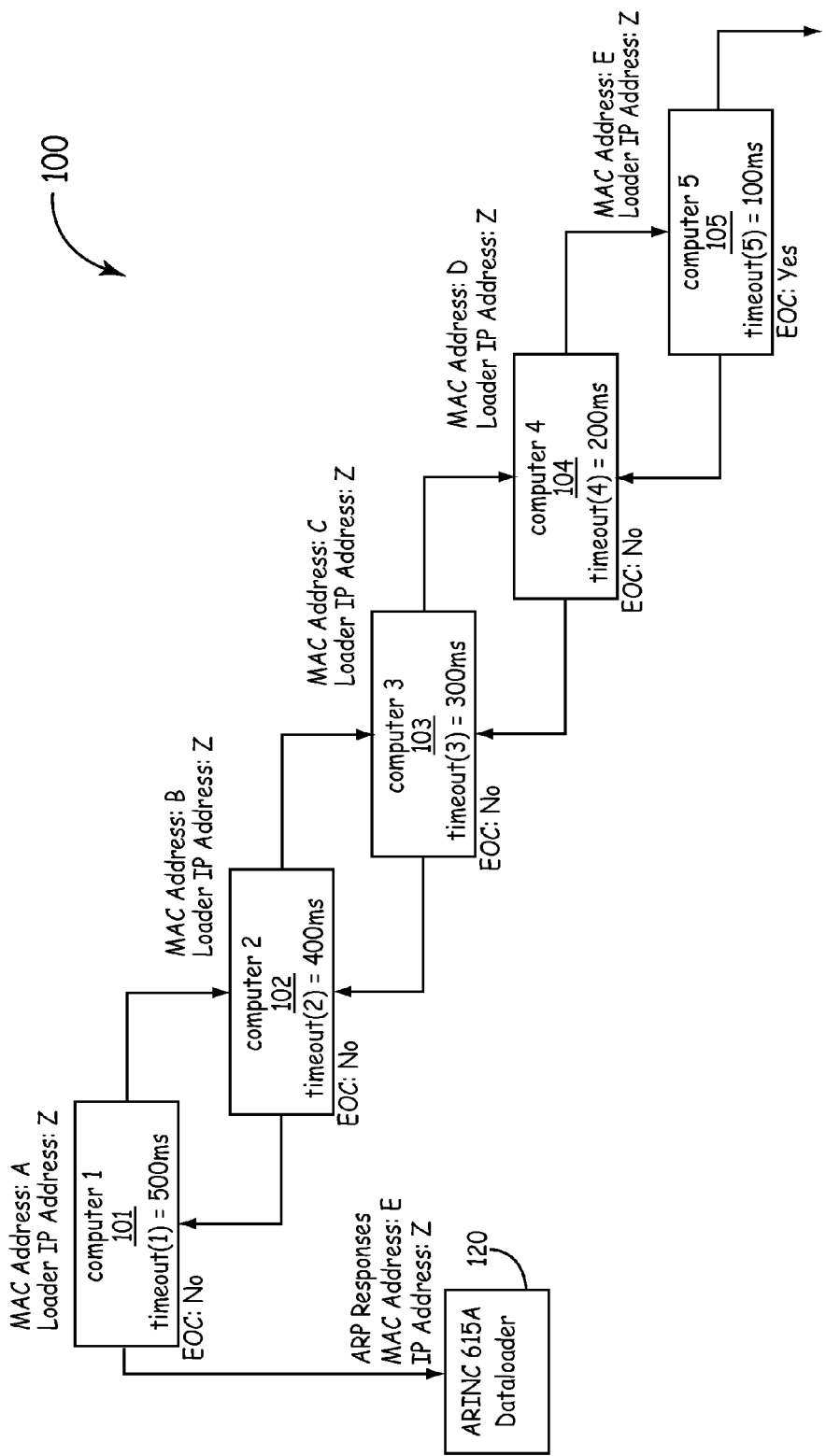
FIGS. 3-10 are block diagrams illustrating the systems and devices of FIGS. 1 and 2 in operation for one embodiment of the present invention.

Computer 102 will receive the ARP Response from computer 103. When it does, it will set its EOC Flag to NO, to indicate it is not the last computer in the chain. In addition, since it is not the first computer on network 100, it will forward computer 103's ARP Response up the chain to computer 101. Lastly, it will increment its timeout(2) value by an increment value. Computer 101 will receive the ARP Response from computer 102. When it does, it will replace the ARP Response it is currently holding onto in memory 230 with the ARP Response that it has received on its upstream input port 252 from downstream. In addition, it will increase its counter timeout(1) value again by the increment value. As should be apparent from this description, each time computer 101 receives an ARP Response from a downstream computer it will increase its counter timeout(1) by the incremental value. Similarly, each time any of the computers 101-105 receive an ARP Response from a downstream computer, they will also increase their respective timeout counter values by their respective increment values. This passing of the ARP Request down the chain, passing the ARP Replies up the chain, updating the EOC, and incrementing the timeout will continue all the way down the chain to the last computer. For this example having five computers, the resulting timeout counter values and EOC values for each of computers 101-105 will end up as shown in FIG. 3.

In addition to passing the ARP Response up the chain, computers 101-104 also pull the source MAC Address from the ARP Responses that they have observed going up the chain, and stores them to a MAC Acceptance Table that each stores in its respective memory 230. The MAC Acceptance Table in each of the intervening computers will thus contain the MAC addresses for the last computer on network 100. Because dataloader 120 will ultimately only be receiving a single ARP response from network 100, and will only be communicating to the computer that generated that ARP response, all of the computers in the chain of network 100 need to be able to identify and receive the network traffic destined for that last computer. This is accomplished by having each of the computers 101-105 monitoring for network traffic having the MAC Address for the computer that ultimately generated the ARP response sent to dataloader 120.

In one embodiment, using the number of ARP Responses the received, each computer 101-105 will set a value to indicate their position in the chain. For example, computer 101 would have a value of 4+1, or 5, since it received 4 ARP Responses. Computer 104 would have a value of 1+1, or 2, since it only received 1 ARP Response. Based on this logic, computer 101 would have a value of 5, computer 102 would have a 4, computer 103 would have a 3, computer 104 would have a 2, and computer 105 would have a 1. In one embodiment, these position values are used to identify a computer's position for advanced error recovery.

The last computer in the chain of network 100 will not receive any ARP Replies and therefore its counter will timeout after attempting to forward the ARP Request downstream. Because the timeouts for each computer 101-105 were adjusted based on the number of ARP Requests they received, the last computer, 105, should be the first to timeout. When it does, because it never received a downstream ARP request, it will set its EOC flag to YES.

Next, all of the remaining display computers will timeout 1 by 1 up the chain, with no more ARP Replies coming up the chain. When computer 101 times out, it will forward the last ARP Response it received from its memory 230 to the dataloader 120. This will be the ARP Response received from the last computer, which in this case is computer 105. Once the end of the chain has been established, future communications to and from network 100 will appear to dataloader 120 as communications to a single computer. That is, even though dataloader 120 is physically coupled first to computer 101, it will effectively be exchanging messages only with computer 105, while computers 101-104 listen to the dialog taking place and cascade messages and responses along the chain.

Figure 4:
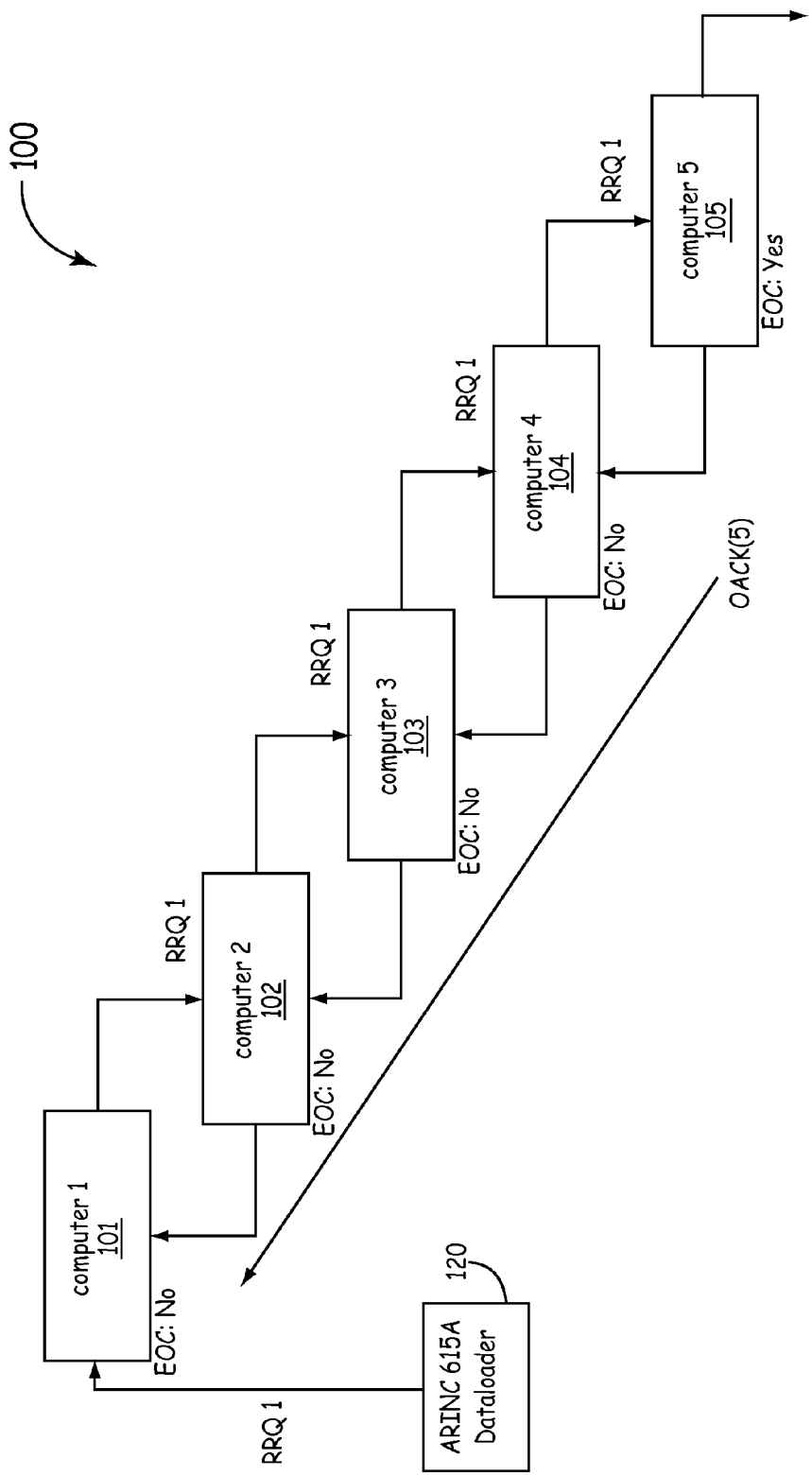

For example, as illustrated in FIG. 4, dataloader 120 will send a first TFTP Read Request (shown as RRQ1) to the first computer 101 to which it is physically connected. RRQ1, however, is addressed to MAC Address: E, the last computer on the chain. From the ARP process above, the network forward function 210 in computer 101 is configured to consume traffic addressed directly to it (that is, MAC Address: A) and in addition will consume any traffic addressed to MAC Address: E, the last computer on the chain. When the network forward function 210 observes the RRQ1 address to MAC Address: E, it will pass the message to processor 220 for consumption. In addition, because computer 101's EOC flag is set to NO, network forward function 204 will forward the TFTP RRQ out port 250 to the next downstream computer. After consuming RRQ1, processor 220 will generate an appropriate Option Acknowledgment (OACK) response. Because computer 101's EOC flag is set to NO, network forward function 204 will not forward that OACK to dataloader 120.

The network forward function 204 in the second computer 102 would also consume RRQ1 after receiving it from computer 101. Because its EOC flag is set to NO, in will in turn forward RRQ1 on to the third computer 103. As before, the second computer 102 will generate a appropriate OACK response to RRQ1, but because computer 102's EOC flag is set to NO, its network forward function 204 will not send that OACK on the wire to the first computer 101.

In the same way as computers 101 and 102, each intervening computer in the chain of network 100 will consume RRQ1, generate an OACK, and withhold transmitting the OACK back up the chain when their EOC flag is set to NO. The last computer in the chain (in this example, computer 105) has its EOC flag set to YES. Therefore, this computer builds the appropriate OACK response to RRQ1 and network forward function 210 transmits the OACK up the chain. The first four computers 101-104 in the chain with their EOC flag set to NO will forward the OACK packet from computer 105 all the way to the dataloader 120.

Figure 5:
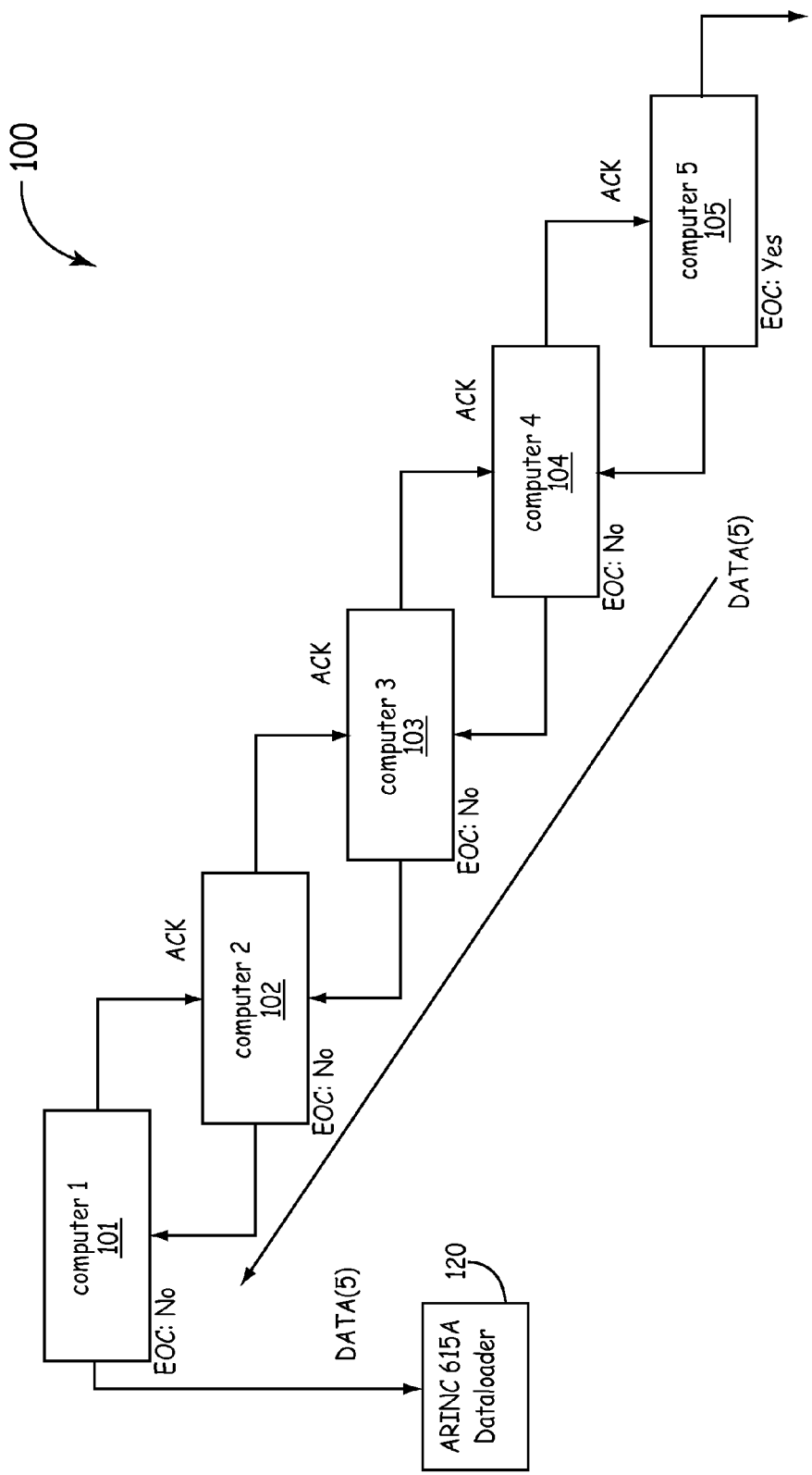

Referring next to FIG. 5, dataloader 120 will respond to the OACK packet from computer 105 by transmitting an Acknowledgment (ACK) packet to computer 101 (to which it is physically connected) addressed to MAC Address: E. In the same way as described above for RRQ1, the ACK will be consumed by each computer 101-105 in the chain thus satisfying the protocol on that computer, as well as forwarded down the chain. In response to receiving the ACK packet, all of the computers 101-105 will generate the file DATA identified by the original TFTP RRQ1. However, computers 101-104 will not transmit their DATA file upstream. Only the last computer's network forward function 204 sends DATA up the chain, because its EOC flag is set to YES. Because the computers 101-104 all have their EOC flags set to NO, they will not transmit their DATA up to dataloader 120. Only the file DATA from computer 105 will be transmitted, and computers 101-104 will forward it along all the way to the dataloader 120 in the fashion described above.

As before, dataloader 120 will respond to the DATA file from computer 105 by transmitting an ACK packet to computer 101 (to which it is physically connected) addressed to MAC Address: E. The ACK will be consumed as before by each computer in the chain thus satisfying the protocol on that computer, as well as forwarded down the chain.

Figure 6:
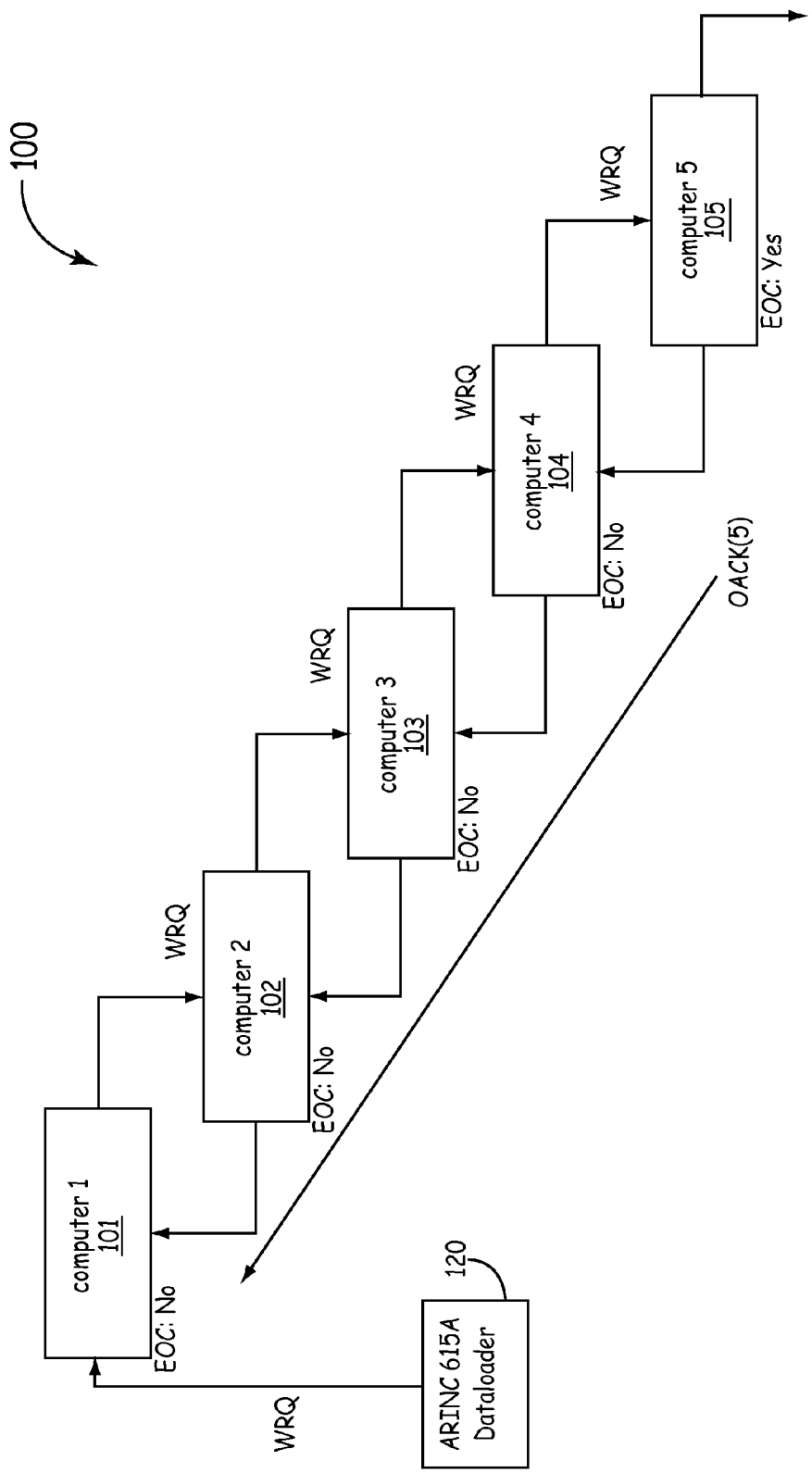

In accordance with the next step in the ARINC 615A protocol, dataloader 120 will send a TFTP Write Request (WRQ) for a load list, as illustrated in FIG. 6. Computers 101-104 will consume and forward the WRQ on to computer 105 where it will also be consumed, but not forwarded since its EOC flag is set to YES. All the computers 101-105 will generate the appropriate OACK response. However, only computer 105's network forward function 204 will transmit the OACK response upstream to be forwarded on by the other computers 101-104 to the dataloader 120.

Figure 7:
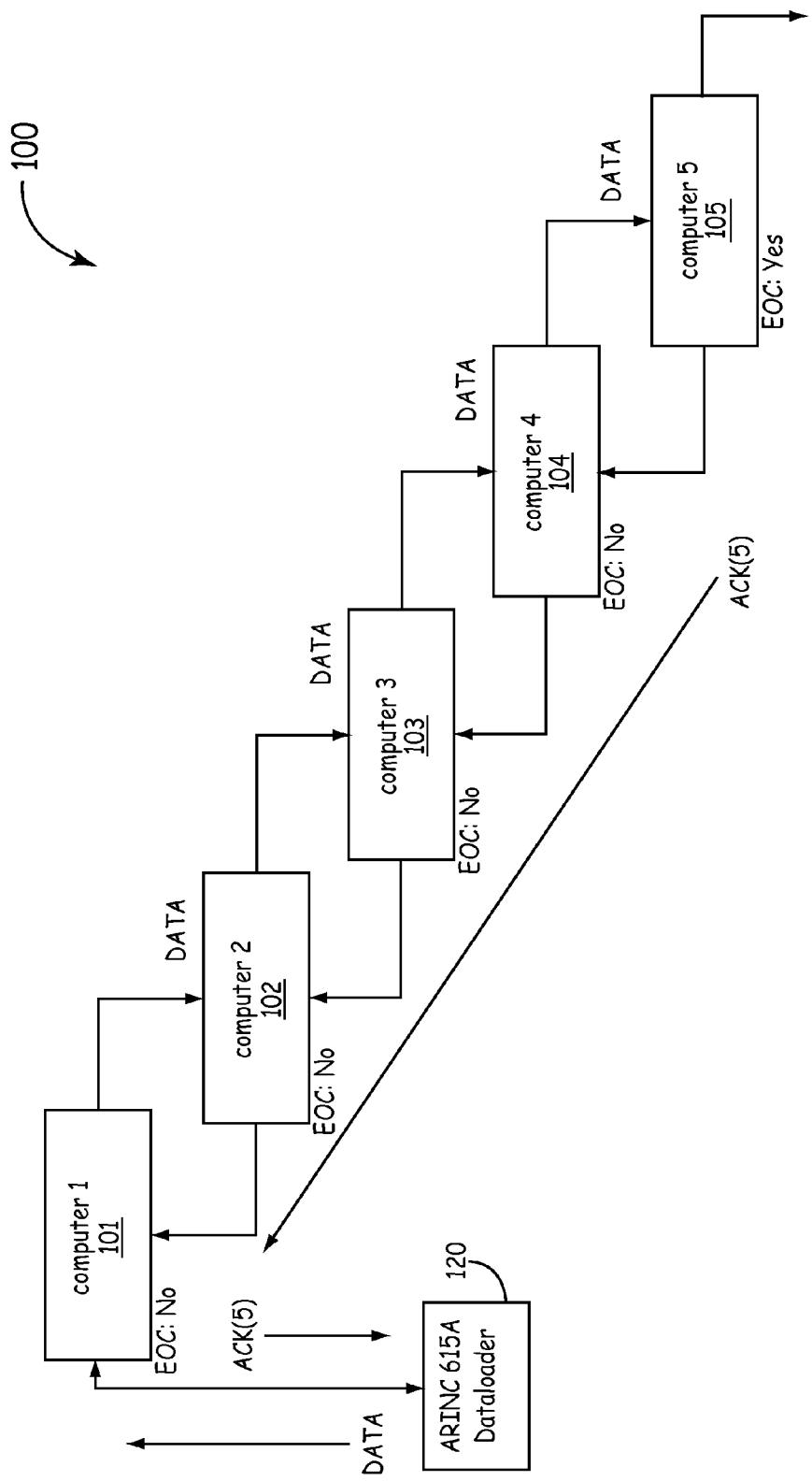

Illustrated in FIG. 7, in response to receiving the OACK generated by computer 105, dataloader 120 will next send a TFTP DATA packet addressed to computer 105. The DATA packet will be consumed and forwarded by all of the computers 101-104 having their EOC flag set to NO. Computer 105, because its EOC flag set to YES, will consume the DATA and respond to the DATA with the appropriate ACK packet. Computers 101-104 will not transmit their own ACK packets, but will only forward upstream the ACK they receive from computer 105.

In the event that computer 105 does not receive the DATA correctly, computer 105 will not generate or forward a response ACK message back to dataloader 120. Eventually, dataloader 120 will timeout because it did not receive an expected ACK response message. After timing out, dataloader 120 will retransmit the last block of data it transmitted, as would be the correct response per the ARINC 615A protocol. In the event that one of the intervening computers 101-104 does not receive the DATA correctly, then that computer would indicate that failure by not forwarding the ACK packet it receives from computer 105. By blocking computer 105's ACK message to dataloader 120, the dataloader 120 will timeout the same as if computer 105 never sent the ACK. Accordingly, the dataloader 120 will retransmit the last block of un-ACKed data to computer 105 and again wait for the ACK. Assuming that the DATA block was correctly received this time by all of the computers 101-105, dataloader 120 will receive computer 105's ACK for that block and proceed accordingly.

Figure 8:
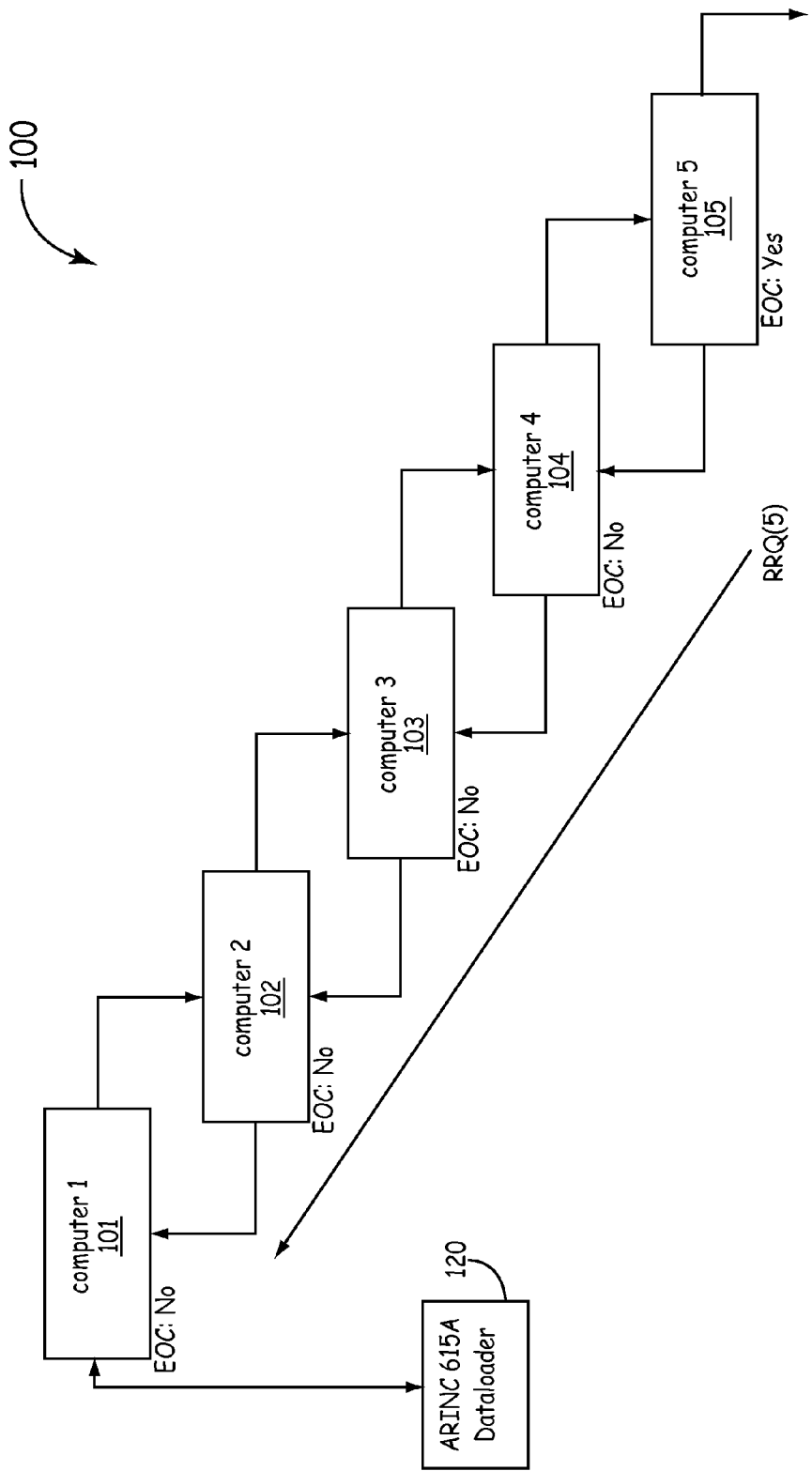
Figure 9:
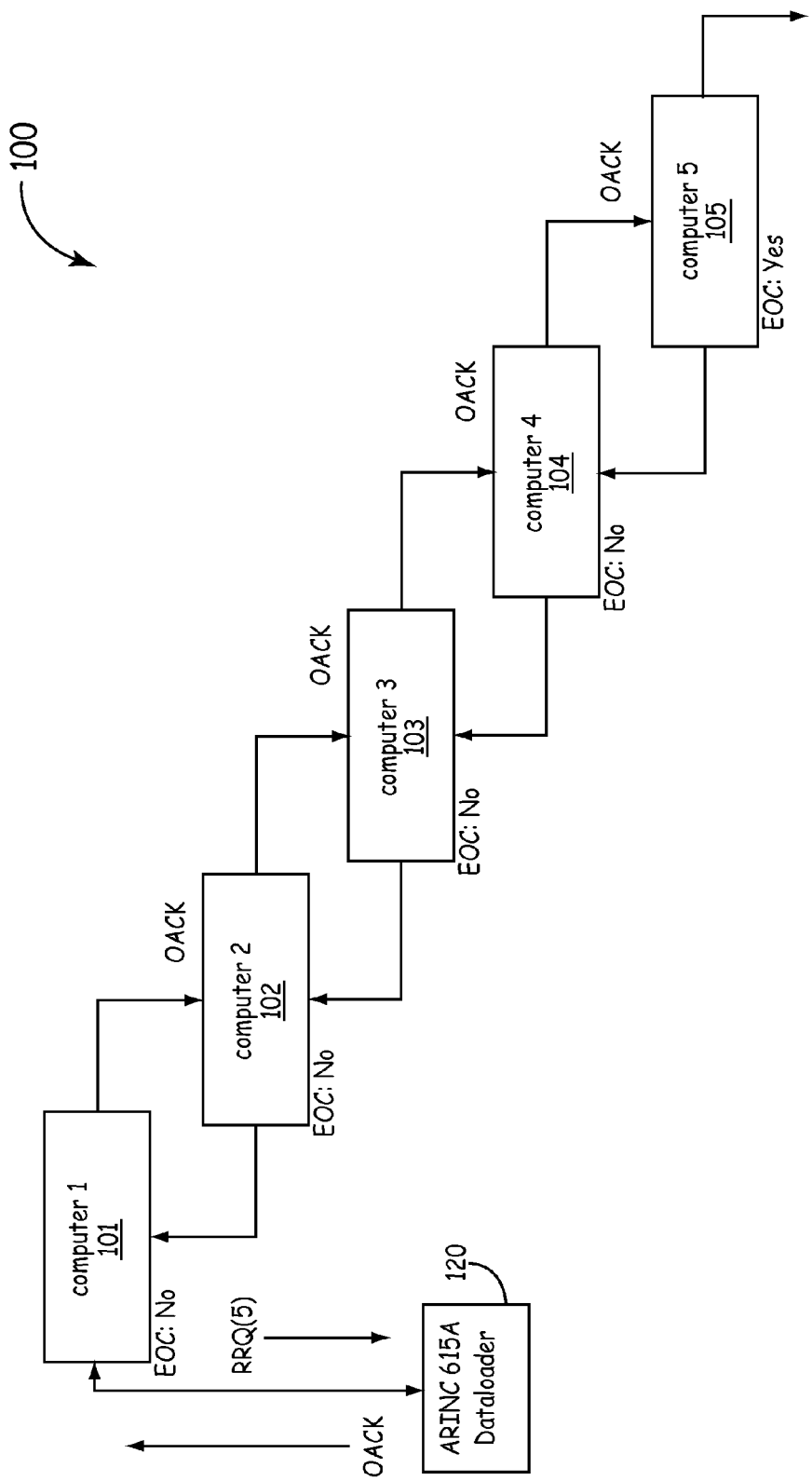
Figure 10:
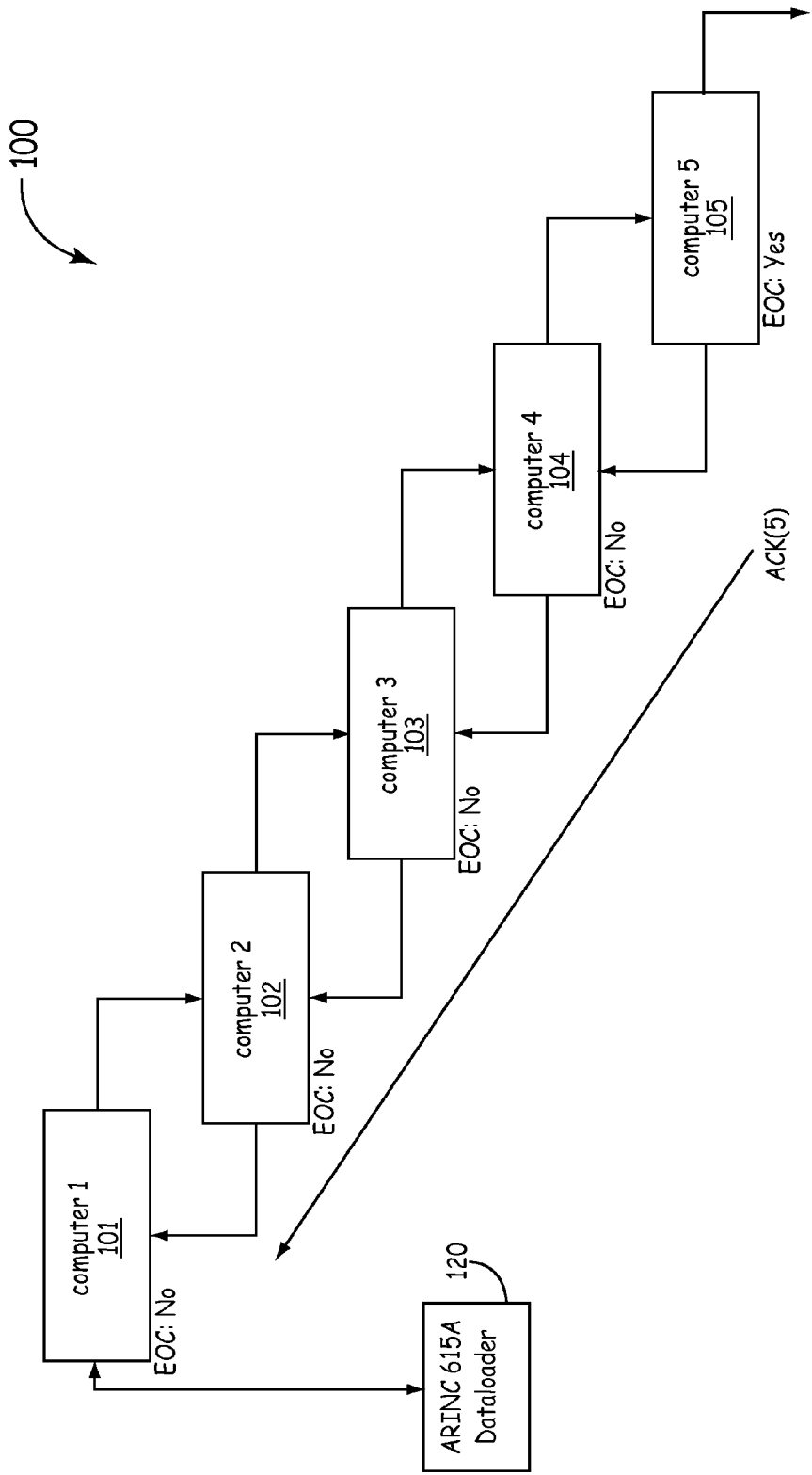

Next, each of the computers 101-105 will generate a TFTP RRQ in response to the DATA received from the dataloader 120, as illustrated in FIG. 8. However, only the network forward function 210 on the last computer (105) will transmit its RRQ out it Upstream Output Port 242.

As would be appreciated by one of ordinary skill in the art after reading this specification, synchronization of RRQ messages is an issue is when the computers 101-105 are requesting load data from the dataloader 120. For example, if a first computer is able to erase or reprogram its memory faster than a second computer, that first computer would be ready to request the next file before the second computer in the chain.

In order to maintain synchronization between all computers 101-105, each computer's network forward function 210 will hold off on forwarding the RRQ from computer 105 towards the dataloader 120 unless it verifies that it has first produced its own TFTP RRQ. That is, intervening computers 101-104 will generate but not transmit their own local RRQ's. Before network forward function 210 will forward a TFT RRQ received from downstream, it first checks to confirm that its own processor 220 is finished consuming the last DATA message and has produced a RRQ. This ensures that when dataloader 120 received the RRQ from computer 105, all computers 101-105 are ready to receive the data associated with the RRQ.

Due to the potential delay of cascading the RRQ from computer 105 up the chain, in one embodiment, computers 101-104 each will either relax their TFTP timeout for TFTP RRQ packets, or increase the number of TFTP retries permitted for a TFTP RRQ. For embodiments where the number of retries are increased, network forward function 204 for each computer would need to be updated to account for multiple RRQs coming up the chain while it is waiting for its own local RRQ to be generated. This way network forward function 204 will not unnecessarily forward on multiple RRQs to the dataloader 120 once its local processor 220 is ready to receive more data.

Once the RRQ from the last computer reaches dataloader 120, it will generate an OACK response addressed to computer 105. This OACK will be consumed and forwarded by computers 101-104, thus satisfying the TFTP protocol on all 5 computers. In response to the OACK, each of the computers 101-105 will generate a corresponding ACK with only computer 105 actually transmitting its TFTP ACK packet upstream. Transmission of the ACKs generated by computers 101-104 will be suppressed (that is, not transmitted) by network forward function 210 in favor of forwarding the ACK from computer 105. In response to the ACK message, dataloader 120 will send the requested DATA packet. Again, the DATA packet is going to be consumed and forwarded by all of the computers 101-104. Computer, with its EOC flag set to YES, will also consume the DATA and transmit the appropriate ACK packet upstream to dataloader 120, thus satisfying the ARINC protocol for all 5 computers.

As would be appreciated by one of ordinary skill in the art reading this specification, with embodiments of the present invention, even though all of the computers are generating the responses to the protocol, there is only one set of data being transmitted from a dataloader to the individual computers and only one set of responses being received by the dataloader. The vast majority of the data during a dataload upload operation is coming from the dataloader to the target computer, so this scheme allows that large amount of data to only be transmitted once and installed on as many target computers as there are in the chain.

Based on this scheme, there are some basic architecture considerations that apply both to the physical configuration of the network and to the ARINC 615A protocol. For a particular computer to be able to consume packets it receives, that computer must be in loader mode. The network forwarding function for computers not in loader mode prior to the last computer in the chain will still participate by forwarding packets up and down the network as described above. Thus, with embodiments of the present invention, each computer individually or any number of computers up to the total number of computers installed can be loaded, as long as only the modules that are destined to be loaded are placed into loader mode. In addition, all of the computers in the chain that have gone to loader mode will be loading the same software.

The computers in loader mode should all have the same IP Address that has been reserved specifically for loading so any non-loader traffic can be properly handled. Since all of the computers in the chain will be receiving the ARP Response from the computer furthest down the chain, all computers up the chain will know that computer's MAC Address from the ARP Response. Since the computer at the end of the chain is effectively responsible for communicating with the dataloader, the other computers filter incoming packets for that specific MAC Address to pick up the correct protocol packets coming from the dataloading and going down the chain.

In one embodiment, the ARINC 615A Upload Initialization File (*.LUI), the ARINC 615A Load List (*.LUR), and the Load Data files (*.LUH and *.LUP) will all be hand shook in a lockstep fashion. In one embodiment, ARINC 615A status files (*.LUS) will only be transmitted by the computer at the end of the chain and will not even be generated by the other computers. In one embodiment, status files in the system are communicated via a unique UDP data port, so the TFTP stack software on the computers not transmitting the status file are able to correctly forward and not consume the unsolicited OACK and ACK packets related to the status file transfer. Those computers not at the end of the chain will look at the overall load status in the status file as the status file is transferred up the chain to ensure the computer at the end of the chain is not aborting the load. If it is, then each computer up the chain will follow suit.

It would be appreciated that a failed load on an individual computer would force that computer to stop loading. If the failed computer is the computer at the end of the chain, then the load operation will halt. At that point, the last computer could be powered down for replacement and the other units up the chain could be loaded in parallel. In one embodiment, if the failed computer is not the computer at the end of the chain, its network forwarding function will continue to forward traffic, so all of the other computers down the chain are able to continue to load.

FIGS. 11-14 are flow charts that capture algorithms for one or more embodiments of the present invention. These algorithms may be utilized by a computer for realizing the network forward function described above. That is, the figures illustrate algorithms executable by computers (such as computers 101-105 and 200) for implementing embodiments of the present invention.

Figure 11:
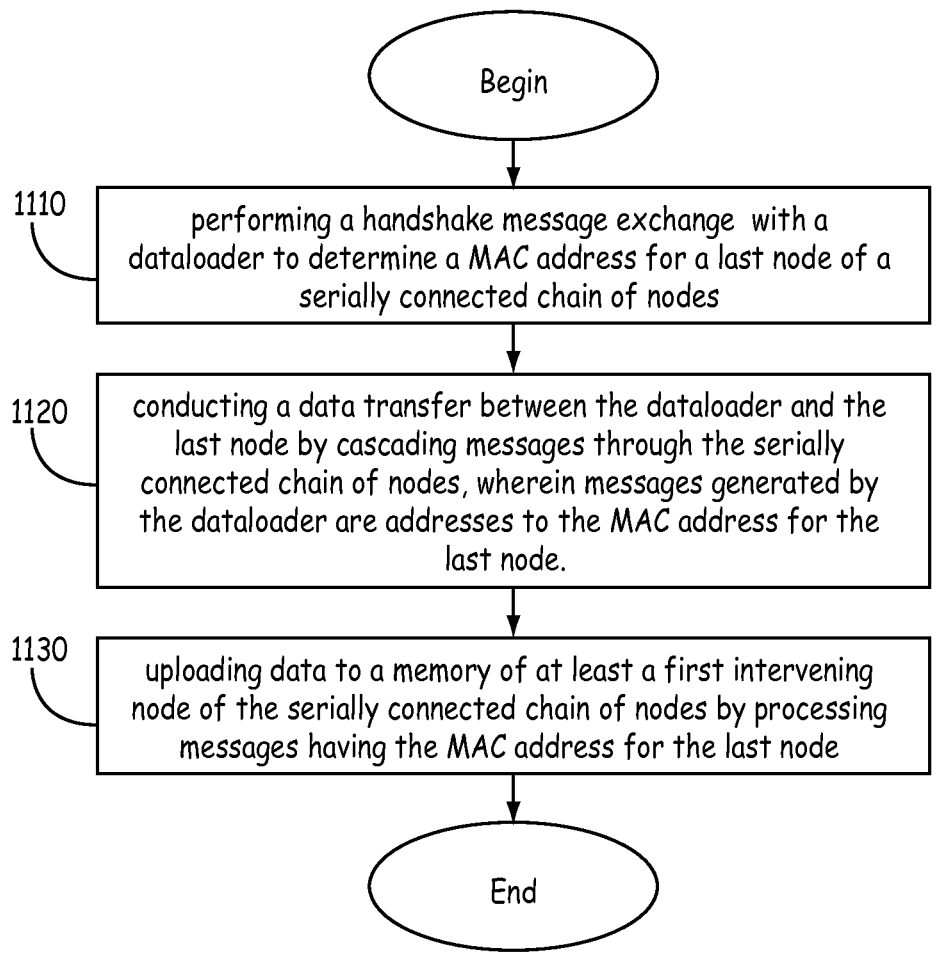
FIG. 11 is a flow chart illustrating a process of one embodiment of the present invention.

FIG. 11 illustrates an overall process flow of a method of one embodiment of the present invention. The method begins at 1110 with performing a handshake message exchange with a dataloader to determine a MAC address for a last node of a serially connected chain of nodes. In one embodiment, the handshake message exchange comprises processing an ARP Request message received from a dataloader as described above with respect to FIG. 3 and illustrated in greater detail in FIG. 12 as discussed below.

The method proceeds to 1120 with conducting a data transfer between the dataloader and the last node by cascading messages through the serially connected chain of nodes, wherein messages generated by the dataloader are addresses to the MAC address for the last node. In one embodiment, TFTP messages and their corresponding response messages are cascaded down and up the chain of serially connected computers as described above with respect to FIGS. 4-10 above and illustrated in greater detail in FIGS. 13 and 14 as discussed below.

The method proceeds to 1130 with uploading data to a memory by consuming messages having the MAC address for the last node. As explained above, in addition to having the last node consume TFTP messages, each of any intervening nodes that are serially connected in the chain of nodes will also consume the TFTP messages, assuming they are in loader mode. Through this process, the intervening nodes observe the TFTP message traffic between the last computer and the dataloader such that they also receive the same software and/or data upgrades as the last computer.

Figure 12:
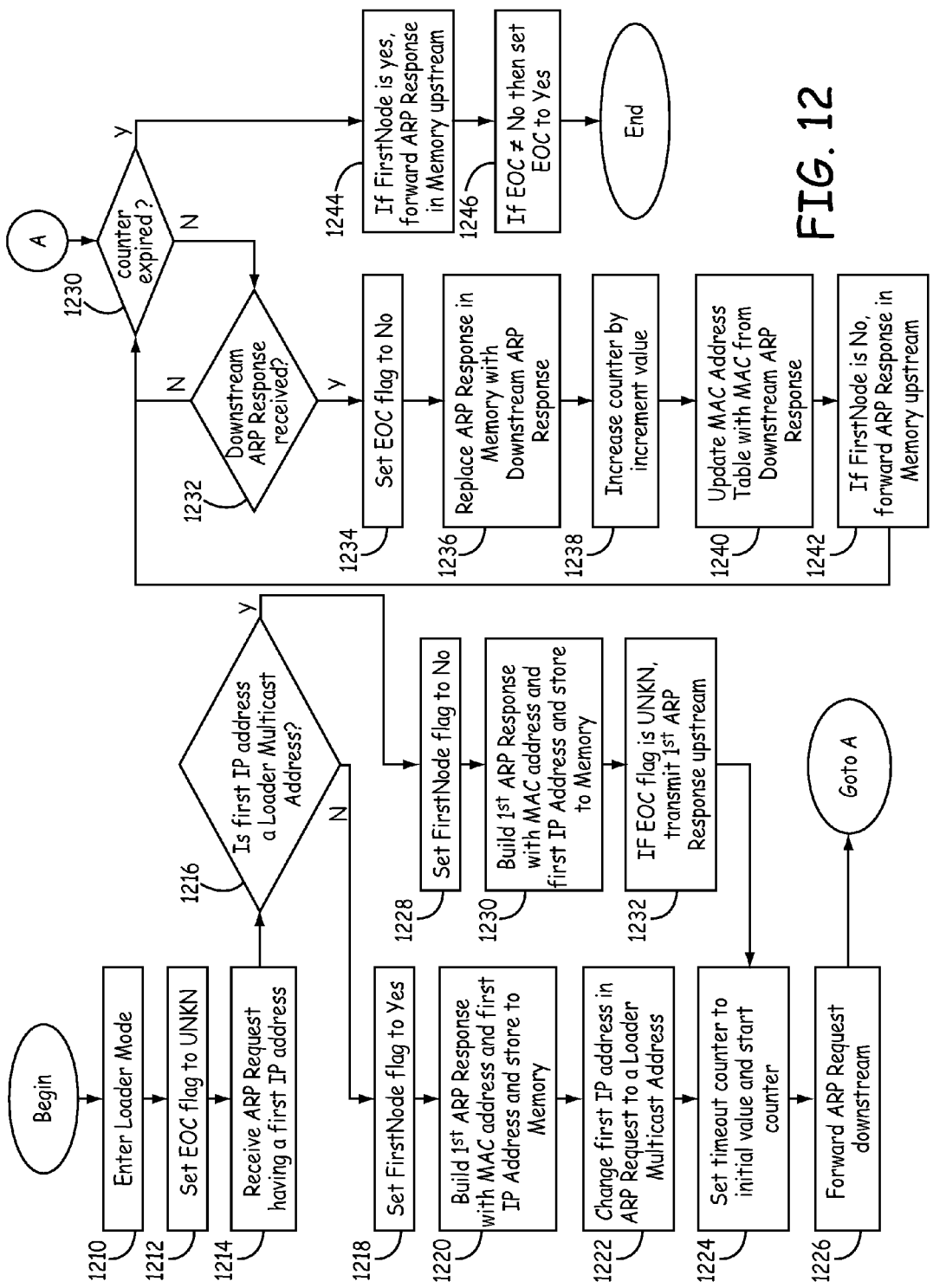
FIG. 12 is a flow chart illustrating a process of one embodiment of the present invention.

FIG. 12 is a flow chart detailing one embodiment of the handshake message exchange performed at block 1110 of FIG. 11.

The process begins at 1210 where the computer is placed in loader mode and proceeds to 1212 where the computers EOC flag is set to unknown (UNKN). At 1214 the computer receives and ARP Request having a first IP address. When the first IP address is not a multicast address (checked at 1216), the computer knows that the ARP request was received directly from the dataloader and that the computer is therefore the first computer in the network chain. Accordingly, the process proceeds to 1218 with setting a FirstNode flag to yes.

The process next proceeds to 1220 where the computer builds a first ARP Response to the ARP Request, the APR Response comprising the MAC address for the computer and the first IP Address. This ARP Response is saved to its Memory. Next, the process proceeds to 1230, where the computer alters the ARP Request by changing the first IP address in ARP Request to a Multicast Address. The computer sets a timeout counter to an initial value (at 1224) and then proceeds to 1226 to forward the ARP Request downstream.

When the first IP address is a multicast address (checked at 1216), the computer knows that the ARP request was not received directly from the dataloader and that the computer is therefore not the first computer in the network chain. Accordingly, the process proceeds to 1228 with setting the FirstNode flag to No. The process next proceeds to 1230 where the computer builds a first ARP Response to the ARP Request, the APR Response comprising the MAC address for the computer and the first IP Address (which would be the multicast address). This ARP Response is saved to its Memory. If the EOC flag is UNKN, the computer will proceed to 1232 and transmit the ARP Response upstream. The computer sets a timeout counter to an initial value (at 1224) and then proceeds to 1226 to forward the ARP Request downstream.

Once the ARP Request is forwarded downstream, the computer will look for APR Responses generated by any downstream computers (as shown at 1232) as long as it's timeout counter continues to countdown (as shown at 1230). When a Downstream APR Response (that is, an APR Response generated by a downstream computer) is received the computer knows that it is not the last computer on the chain and therefore proceeds to 1234 with setting the EOC flag to No. The computer then replaces the ARP Response currently in Memory with the Downstream ARP Response just received (as shown at 1236). In order to allow time for receipt of any other downstream ARP Responses, the process proceeds to 1238 by increasing the timeout counter value by an increment value. In one embodiment, the increment value is equal to the initial valued used by the counter. The process further proceeds to 1240 with updating the MAC Address Table with MAC Address from the Downstream ARP Response. The process proceeds to 1238, where when the computer is not the first node in the chain, the computer will forward the ARP Response stored in Memory upstream. The process then returns to 1230 and 1232 to look for any further APR Responses generated by downstream computers as long as it's timeout counter continues to countdown. When the timeout counter expires (checked at 1230), the process proceeds to 1244 where, if the computer is the first node (i.e., the FirstNode flag is yes) it will forward the ARP Response stored in Memory upstream. Further if no downstream ARP responses were received (checked at 1246) then the EOC flag for the computer is set to yes, indicating that it is the last computer in the chain.

Figure 13:
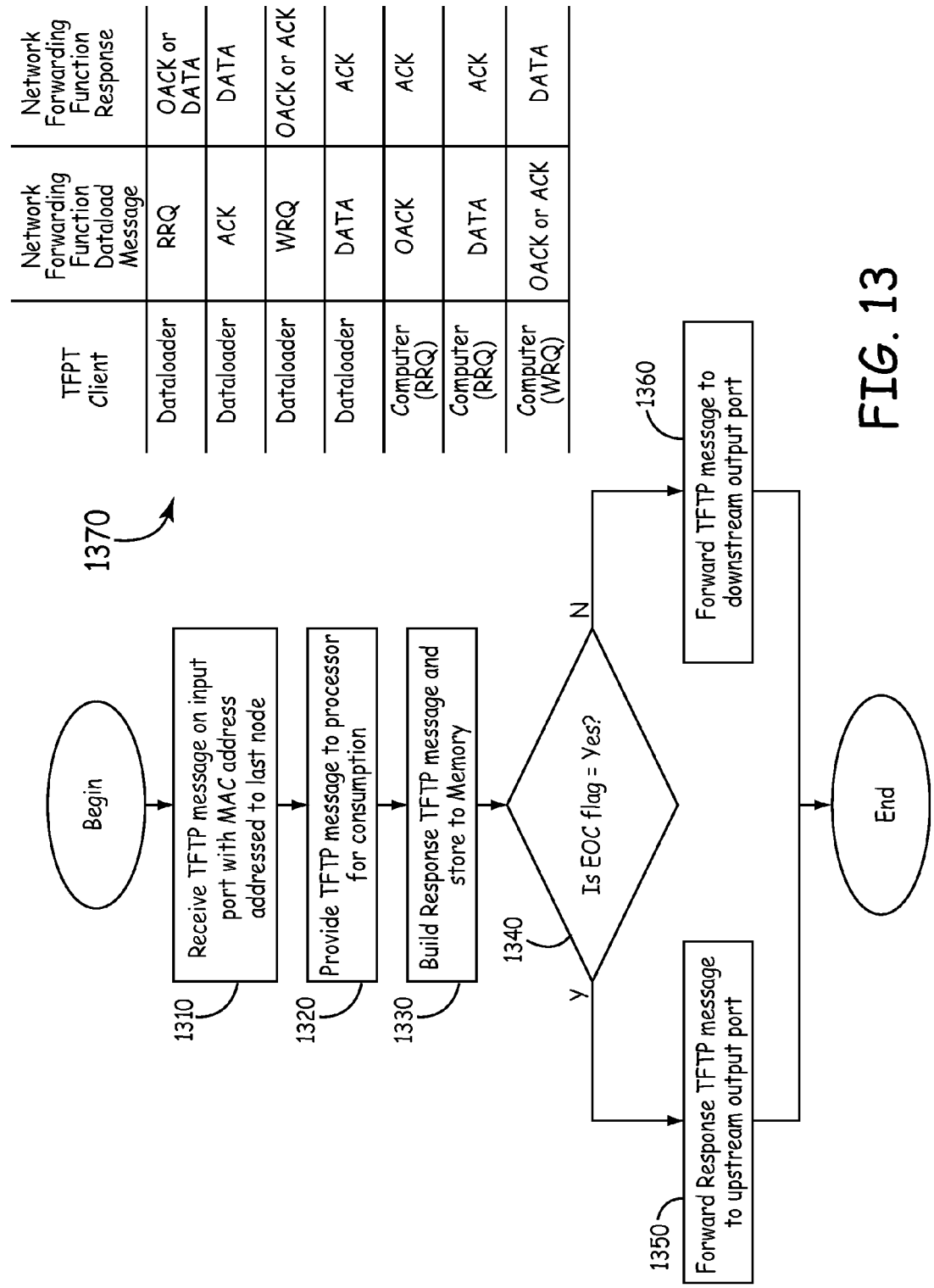
FIG. 13 is a flow chart illustrating a process of one embodiment of the present invention.

FIG. 13 is a flow chart detailing one embodiment of conducting a data transfer between the dataloader and the last node by cascading messages through the serially connected chain of nodes as performed at block 1120 of FIG. 11, and uploading data to a memory by consuming messages having the MAC address for the last node as performed at block 1130 of FIG. 11. The process begins at 1310 with receiving a TFTP message on the computer's input port, the message having a MAC address addressed to last node. Since the computer is in loader mode, the process proceeds to 1320 with providing the TFTP message to the processor for consumption. The process proceeds to 1330 where the processor builds a response TFTP message and stores that message to memory. When the computer is the last computer (checked at 1340 by determining if the EOC flag is set to Yes), the process proceeds to 1350 with Forwarding the Response TFTP message to the upstream output port. When the computer is not the last computer (again, checked at 1340) the computer proceeds to 1360 with forwarding the TFTP message to the downstream output port. As illustrated in FIG. 13 by the table at 1370, the appropriate Response TFTP message to be generated is a function of the TFTP message received from upstream. For example, the appropriate response for a computer to generate after receiving an RRQ message from the dataloader is an OACK response message. Responses for other messages are shown at 1370 and/or described above.

Figure 14:
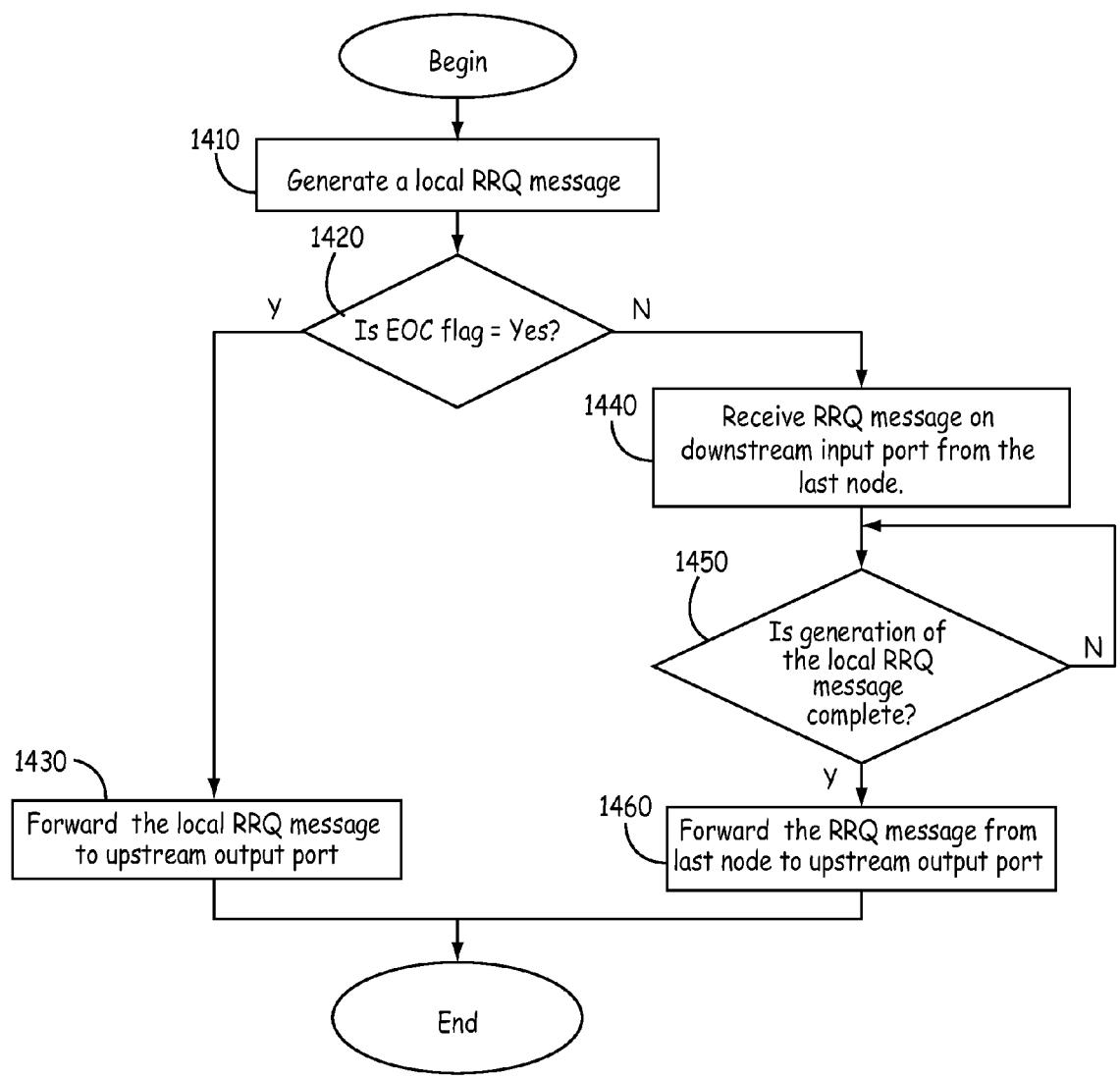
FIG. 14 is a flow chart illustrating a process of one embodiment of the present invention.

FIG. 14 is a flow chart detailing one embodiment of a process for synchronizing RRQ messages generated by the computers in the chain. The method begins at 1410 with generating a local RRQ message. When the computer is the last computer (checked at 1420 by determining if the EOC flag is set to Yes), the process proceeds to 1430 with forwarding the local RRQ message to upstream output port. When the computer is not the last computer (as checked at 1420), the process proceeds to 1440 where it waits to receive an RRQ message on the computer's downstream input port from the last node. After verifying that generation of the computer's local RRQ message is complete (verified at 1450), the process proceeds to 1460 with forwarding the RRQ message received from last node to upstream output port. If a RRQ message from the last node is received prior to generation of the local RRQ message, the computer will not forward the RRQ message received from last node until generation of the local RRQ message is completed. In this way, the process ensures that the local computer is finished processing prior to sending any request to the dataloader for more data.

Figure 15:
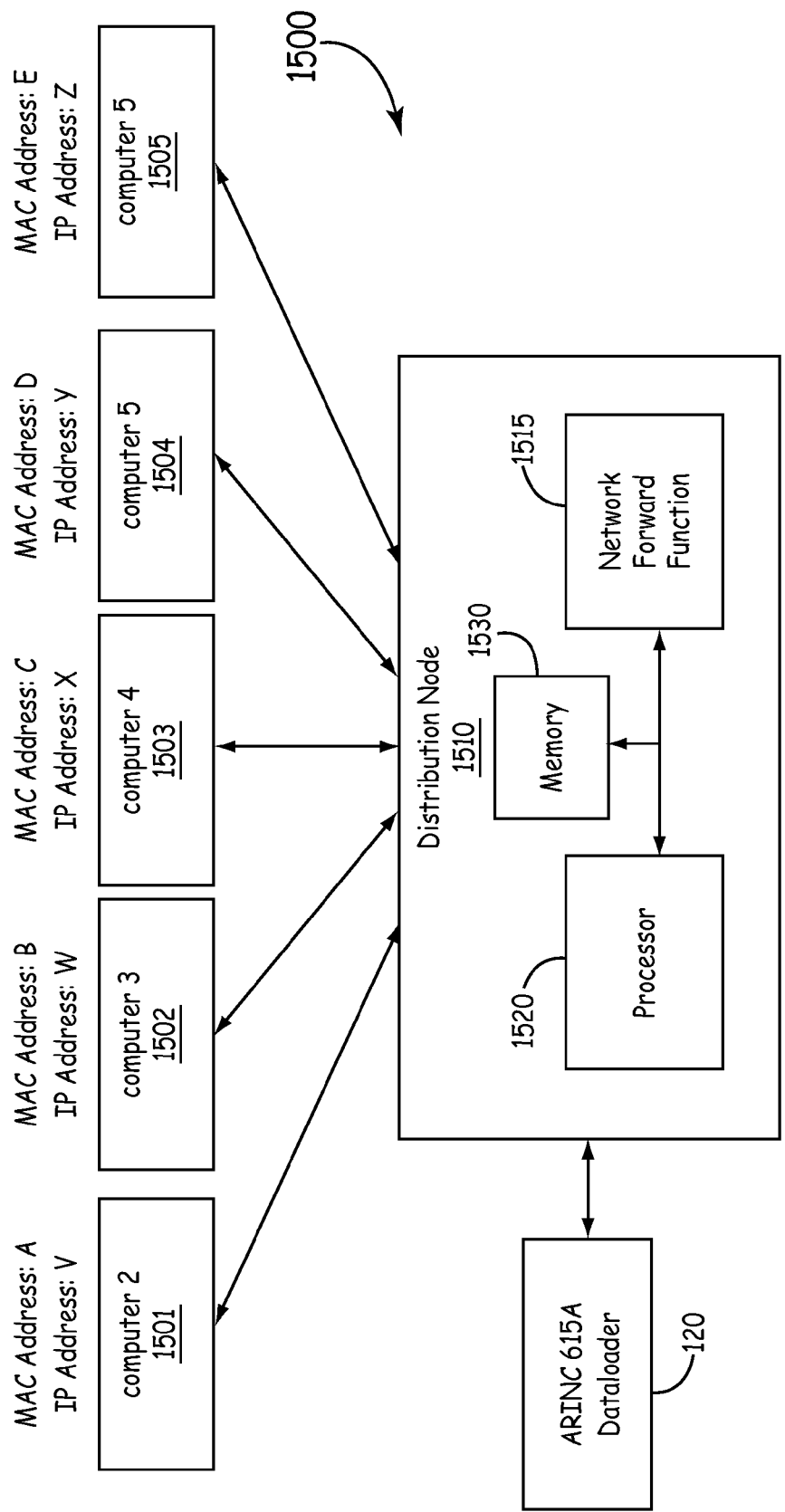
FIG. 15 is a block diagram illustrating an alternate system structure of one embodiment of the present invention.

FIG. 15 is a block diagram illustrating an alternate network configuration (at 1500) where a single distribution node 1510 is configured to physically couple with dataloader 120, but in contrast to FIG. 1, the plurality of computers 1501-1505 to be loaded are serially connected directly to the single distribution node 1510. In one embodiment, single distribution node 1510 is implemented using a computer such as computer 200 illustrated in FIG. 2.

Distribution node 1510 executes a network forwarding function 1515 that facilitates a dialog between dataloader 120 and one of the computers, such as computer 1501, for example. In one embodiment, the network forward function 1515 is implemented as a software algorithm that is stored in memory 1530 and executed by processor 1520.

Figure 16:
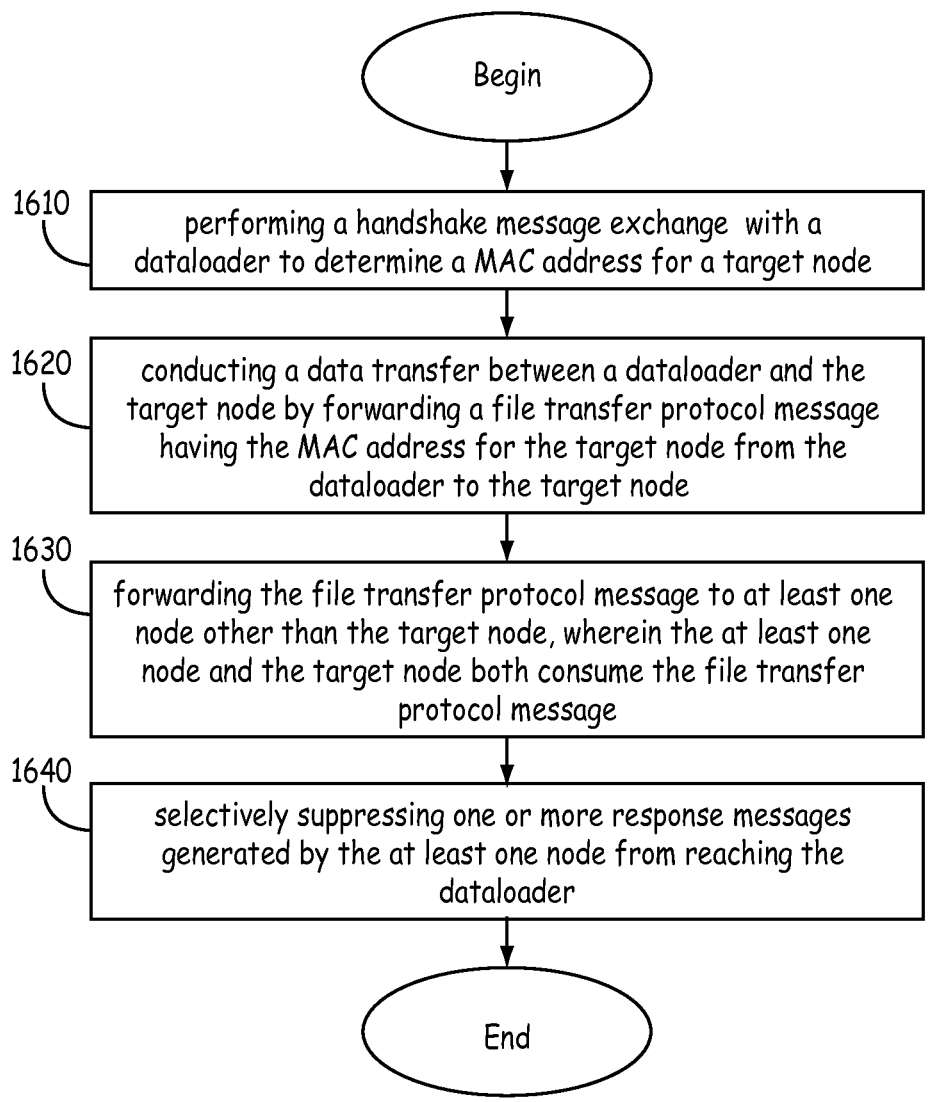
FIG. 16 is a flow chart illustrating a process of one embodiment of the present invention.

Network forwarding function 1515 facilitates a dialog between the dataloader 120 and computer 1501 by forwarding messages originated by dataloader 120 to computer 1501, and selectively forwarding messages originated by computer 1501 to dataloader 120. As it observes this dialog, the network forwarding function 1515 will broadcast messages sent from the dataloader to the first computer to the other computers 1502-1505. Upstream messages, or the lack thereof, from computers 1502-1505 would be evaluated by the network forwarding function 1515, but only messages from computer 1501 would be forward upstream back to dataloader 120. Thus, network 1500 works in principal the same as network 100 in that the dataloader 120 effectively communicates with only a single target computer in order to perform a dataload, but one or more additional computers receive the dataloader by observing and consuming the data in messages addressed to the target computer. That is, both networks 100 and 1500 work on the principal illustrated in FIG. 16, which comprises performing a handshake message exchange with a dataloader to determine a MAC address for a target node (at block 1610), conducting a data transfer between a dataloader and the target node by forwarding messages having the MAC address for the target node from the dataloader to the target node (at block 1620), forwarding the messages to at least one node other than the target node, wherein the at least one node consumes the messages (at block 1630), and selectively suppressing messages generated by the at least one node from reaching the dataloader (at block 1640). In the case of network 100, the target node is the last node in the chain. In the case of network 1500, the target node is one of the computers coupled to the distribution node 1510.

In one implementation of the configuration shown in FIG. 15, the distribution node 1510 figures out which of the computers 1501-1505 are in the set designated to receive software (that is, which of the computers 1501-1505 are in loader mode). Distribution Node 1510 will send an ARP message with a loader multicast IP to all of those computers in the set. Distribution Node 1510 will then send the ARP response it received from one of the computers (which will be the one that Distribution Node 1510 designates to be the end of the chain), to the other computers in the set so they will set their END_OF_CHAIN flags to NO. At that point, the computer that not sent the ARP response will know that it has been designated as the "last" computer and will be the computer that communicates with dataloader 120. The other computers that received the ARP reply from the last computer will add the MAC address for the last computer to their table. At this point forward distribution node 1510 can send all data to all computers in loader mode, and load them all at once.

Figure 17:
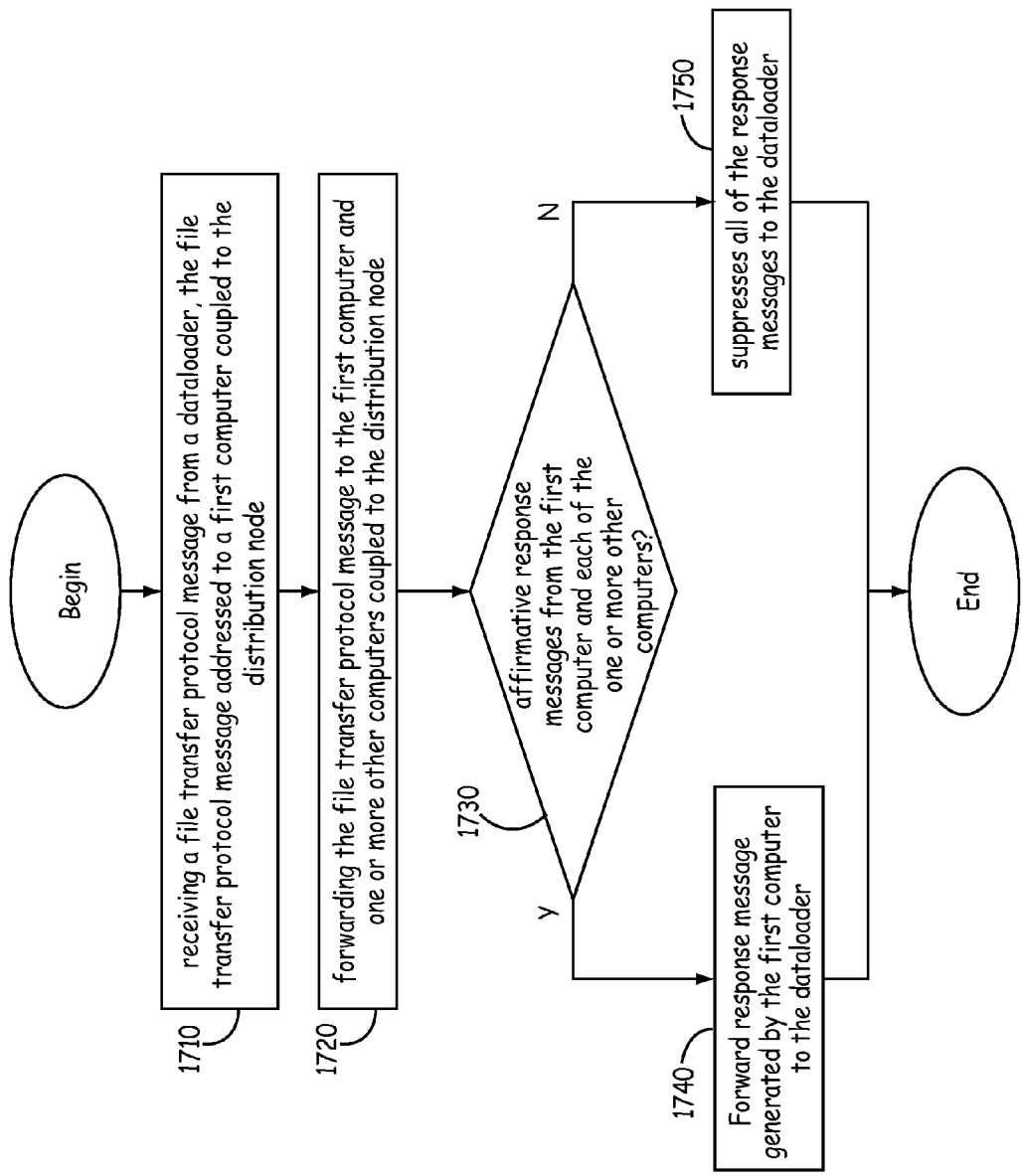
FIG. 17 is a flow chart illustrating a process of one embodiment of the present invention.

More particular to network 1500, FIG. 17 illustrates a process such as one performed by network forwarding function 1515 stored in the memory 1530 of distribution node 1510 and executed by a processor 1520 on distribution node

1510. That is, the figure illustrates an algorithm executable by computers (such as computers 101-105 and 200) for implementing embodiments of the present invention.

The process begins at 1710 with receiving a file transfer protocol message (such as a TFTP message) from a dataloader, the file transfer protocol message addressed to a first computer coupled to the distribution node. The process proceeds to 1720 with forwarding the file transfer protocol message to the first computer and one or more other computers coupled to the distribution node. When the distribution node receives affirmative response messages from the first computer and each of the one or more other computers (checked at 1730), the process proceeds to 1740 where the distribution node forwards a response message generated by the first computer to the dataloader. That is, only responses from the target first computer are forwarded back to the dataloader. Response messages generated by the other computers are suppressed by the distribution node. As used herein, a response message is an "affirmative response message" when it provides an appropriate affirmative response to reception of the file transfer protocol message according to the protocol. For example, FIG. 13 at 1370 provides examples of TFTP messages and appropriate response TFTP messages. When either the first computer or one or more of the other computers fails to generate an appropriate affirmative response (checked at 1730), the process proceeds to 1750 where the distribution node suppresses all of the response messages to the dataloader. By doing so, the dataloader will timeout and attempt to resend the file transfer protocol message.

Several means are available to implement the systems and methods discussed in this specification. These means include, but are not limited to, digital computer systems, microprocessors, programmable controllers and field programmable gate arrays (FPGAs) or application-specific integrated circuits (ASICs). Therefore other embodiments of the present invention are program instructions resident on computer readable media which when implemented by such means enable them to implement embodiments of the present invention. Computer readable media include any form of a physical computer memory storage device. Examples of such a physical computer memory device include, but is not limited to, punch cards, magnetic disks or tapes, optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A computer configured to serially connect to a chain of computers for uploading duplicate data, the computer comprising:
   a processor;
   a memory;
   a downstream input port for receiving messages traveling in a downstream direction;
   an upstream input port for receiving message traveling in an upstream direction;
   a downstream output port for forwarding messages in the downstream direction;
   an upstream output port for forwarding messages in the upstream direction;
   a network forward function executed by the processor, wherein the network forward function:
   performs a handshake message exchange with a dataloader to determine a MAC address of a target node of the chain of computers;
   forwards file transfer protocol messages received via the downstream input port and having the MAC address for the target node to the downstream output port;
   causes the processor to locally consume the file transfer protocol messages;
   selectively suppresses one or more messages responding to the file transfer protocol messages from being forwarded upstream to the dataloader;
   and
   wherein the network forward function verifies that a local read request (RRQ) message has been generated by the processor prior to forwarding a RRQ message received via the upstream input port.

2. The computer of claim 1, wherein the target node is a last node on the chain of computers.

3. The computer of claim 1, wherein the computer is an intervening computer on the chain of computers between the dataloader and the target node.

4. The computer of claim 1, wherein when the downstream input port receives a file transfer protocol message having a MAC address of the target node, the processor consumes the file transfer protocol message, builds a response file transfer protocol message, and stores the response file transfer protocol message in the memory;
   wherein the network forward function suppresses the response file transfer protocol message from being forwarded to the dataloader when the computer is not a last node on the chain of computers.

5. The computer of claim 4, wherein the network forward function forwards the response file transfer protocol message to the to the upstream output port when the computer is the last node on the chain of computers.

6. The computer of claim 1, wherein the handshake message exchange further determines one or both of whether the computer is a first computer on the chain of computers, and whether the computer is a last computer on the chain of computers.

7. The computer of claim 1, wherein the network forward function determines a value for setting a timeout counter based on a number of response messages received via the upstream input port during the handshake message exchange.

8. The computer of claim 1, wherein the network forward function stores the MAC address of the target node in a MAC Address Table stored in the memory based on response messages received via the upstream input port during the handshake message exchange.

9. The computer of claim 1, wherein the network forward function selectively forwards response file transfer protocol messages received via the upstream input port to the upstream output port.

10. A distribution node for distributing duplicate data for consumption to a plurality of computers coupled to the distribution node, the distribution node comprising:
    a processor;
    a memory;

a network forward function being executed by the processor, wherein the network forward function:
forwards a file transfer protocol message received from a dataloader and addressed to a first computer of the plurality of computers to the first computer;
forwards the file transfer protocol message to one or more other computers of the plurality of computers;
compares response messages received from the first computer and the one or more other computers in response to the file transfer protocol message;
when an affirmative response message is received from the first computer and the one or more other computers, the network forwarding function forwards a response message received from the first computer to the dataloader and suppresses the response messages from the one or more other computers; and
wherein when an affirmative response message is not received from at least one of the plurality of computers in response to the file transfer protocol message, the network forwarding function suppresses any response messages received in response to the file transfer protocol message.

11. The distribution node of claim 10, wherein the network forward function performs a handshake message exchange with the dataloader to determine a MAC address of the first computer.

12. A method for simultaneously uploading duplicate data to a plurality of computers, the method comprising:
performing a handshake message exchange with a dataloader to determine a MAC address for a target node;
conducting a data transfer between the dataloader and the target node by forwarding a file transfer protocol message having the MAC address for the target node from the dataloader to the target node;
forwarding the file transfer protocol message to at least one node other than the target node, wherein the at least one node and the target node both consume the file transfer protocol message;
selectively suppressing one or more response messages generated by the at least one node from reaching the dataloader; and
wherein when an affirmative response message is not received from either the target node or the at least one node in response to the file transfer protocol message, suppressing any response messages received in response to the file transfer protocol message from being forwarded to the dataloader.

13. The method of claim 12, wherein the target node is a last node of the plurality of computers; and
wherein the at least one node comprises at least one intervening computer between the dataloader and the target node.

14. The method of claim 13, wherein the handshake message exchange further determines which computer in the plurality of computers is the target node by determining which computer is the last computer.

15. The method of claim 14, further comprising:
storing a MAC address for the target node in a MAC Address Table based on last response messages received during the handshake message exchange.

16. The method of claim 12, wherein the target node and the at least one node are both directly coupled to a distribution node, wherein the distribution node is coupled to the dataloader.

17. The method of claim 16, further comprising:
comparing any response messages received from the target node and the at least one node in response to the file transfer protocol message;
when affirmative response messages are received from the target node and the at least one node, the network forwarding function forwards a response message received from the target node to the dataloader and suppresses any response messages receive in response file transfer protocol message from the one or more other computers.

* * * * *